United States Patent [19]

Justice

[11] 3,852,655
[45] Dec. 3, 1974

[54] HIGH EFFICIENCY POWER SUPPLY

[75] Inventor: Gregory Justice, Mountain View, Calif.

[73] Assignee: Hewlett-Packard Company, Palo Alto, Calif.

[22] Filed: Jan. 29, 1973

[21] Appl. No.: 327,541

Related U.S. Application Data

[63] Continuation of Ser. No. 144,618, May 18, 1971, abandoned.

[52] U.S. Cl............................ 321/9, 321/18, 321/47
[51] Int. Cl. ............................................. H02m 1/14
[58] Field of Search .............. 321/8, 10, 18, 45, 47, 321/9

[56] References Cited
UNITED STATES PATENTS

| | | | |
|---|---|---|---|
| 1,852,125 | 4/1932 | Miessner............................ | 321/10 |
| 3,299,341 | 1/1967 | Corey ................................. | 321/47 |
| 3,320,512 | 5/1967 | Kruger................................ | 321/10 |
| 3,439,253 | 4/1969 | Piteo................................... | 321/47 X |

FOREIGN PATENTS OR APPLICATIONS

| 89,793 | 10/1960 | Denmark ............................ | 321/10 |
|---|---|---|---|

Primary Examiner—William M. Shoop, Jr.
Attorney, Agent, or Firm—Roland I. Griffin

[57] ABSTRACT

A high efficiency, AC-to-DC power supply is provided in which a novel a rectifier bridge coupled to the input line. This rectifier bridge is comprises a pair of inductors mutually inductively coupled and inter-connected so as to be aiding around the bridge in one mode to rectify the incoming voltage from a 115 volt line and in a second mode to rectify the incoming voltage from a 230 volt line, the output voltage from the bridge is being the same amplitude for either mode of operation. A novel ripple voltage frequency doubling circuit is provided, to decrease the size of the components needed to filter the ripple. A novel circuit is provided for converting incoming line voltage variations to changes in the turn on time of the bridge control devices, e.g. SCRs, thus maintaining a regulated level of output voltage with varying amplitude input voltage. A modified switching transistor circuit is also provided wherein the switching transistor is operated in saturation and the driving transistor is out of saturation resulting in substantial power savings in the switching transistor circuit.

4 Claims, 11 Drawing Figures

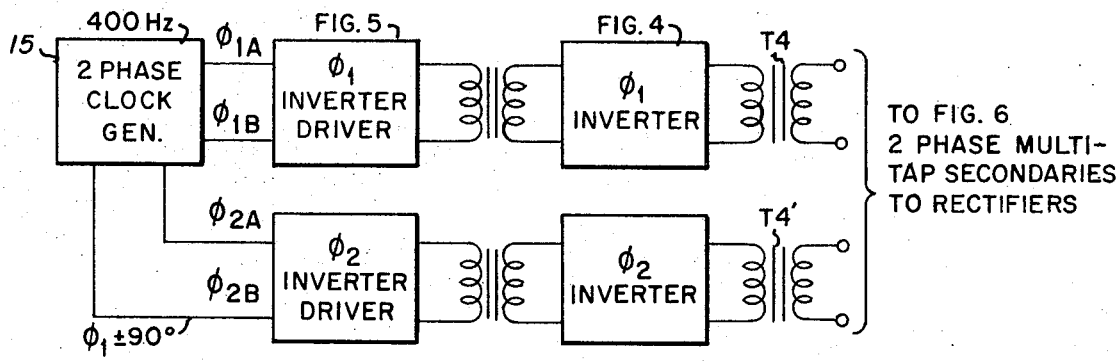
Fig_3
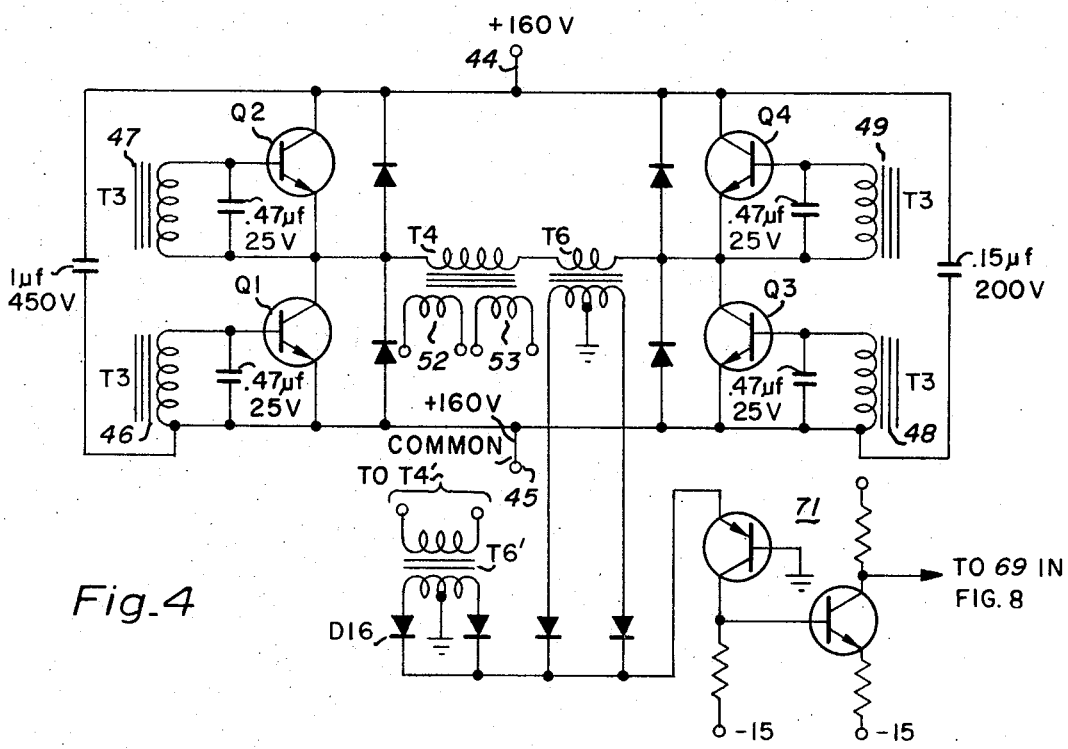
Fig_4
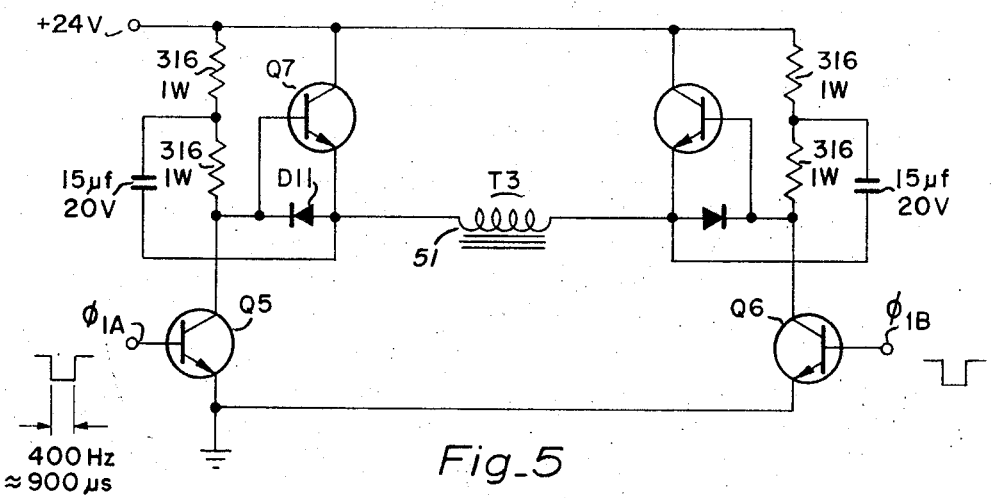
Fig_5

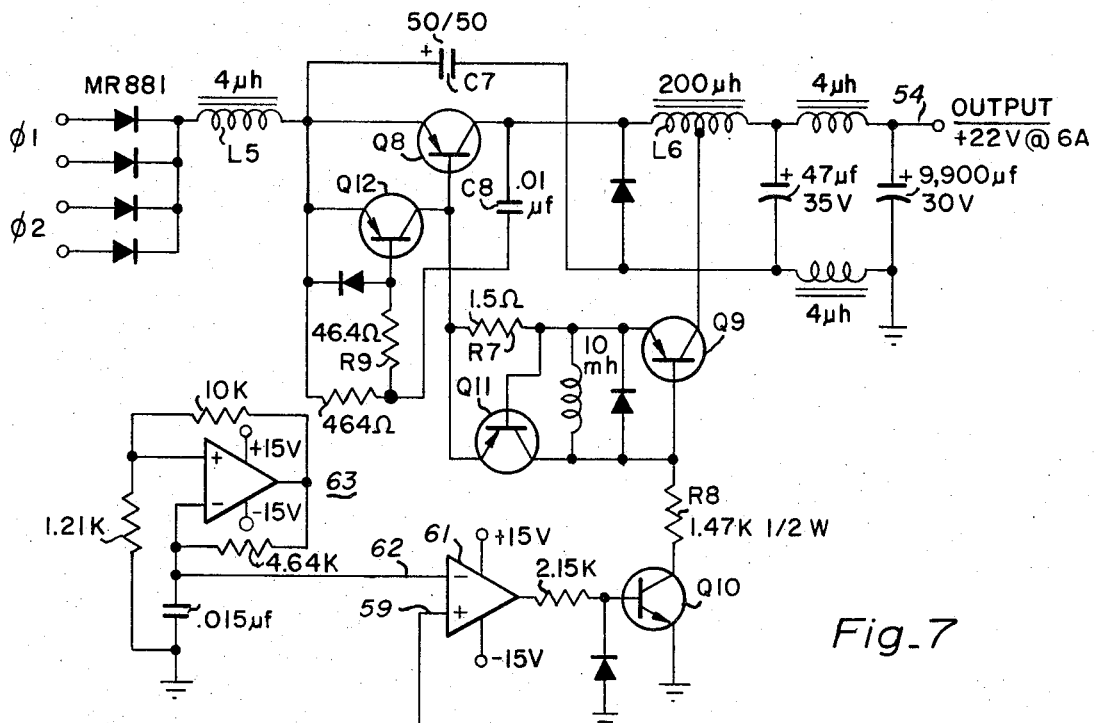
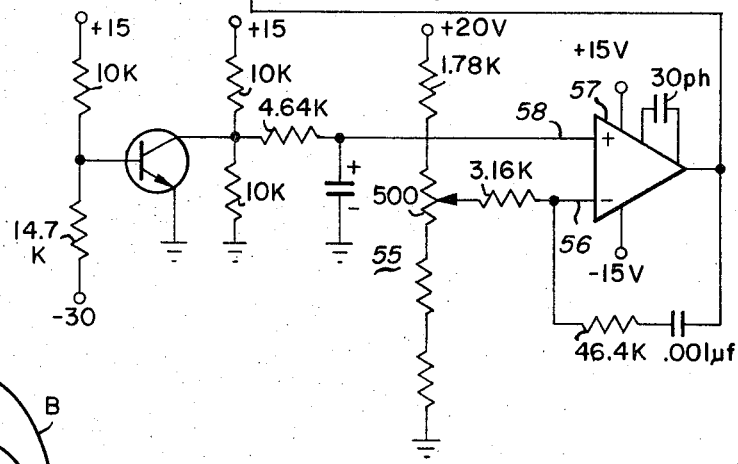
Fig. 7
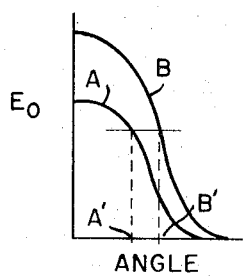
Fig. 9
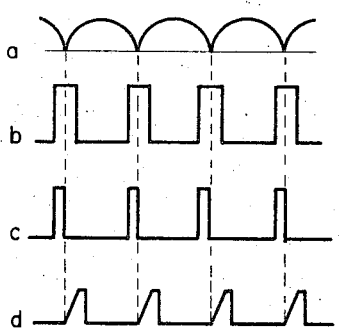
Fig. 11
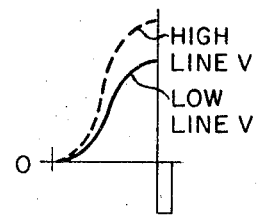
Fig. 10

HIGH EFFICIENCY POWER SUPPLY

This is a continuation, of application Ser. No. 144,618, filed May 18, 1971.

BACKGROUND OF THE INVENTION

In the electrical power supply art, efficient AC to DC conversion is difficult to obtain when the primary power input is sinusoidal, and at a low frequency which is the case with a standard supply line voltage at 50 or 60Hz. Large filter chokes are required to keep surge currents to a minimum and large filter capacitors are required to sustain the output load during the input wave commutation intervals. A significant improvement in size and weight is realized if the primary power is multi-phased, such that the input to the filter section never reduces to zero; such multi-phased power is seldom available however.

In electronic equipment utilizing transistors and integrated circuits, AC power supplies are used to provide the several DC voltage levels needed to operate the electronic circuits. For example, a typical computer may require DC voltage levels of from plus or minus 2 volts to plus or minus 30 volts and from ½ amp to 60 amps. These power supplies must have well regulated output voltage levels regardless of substantial variations in supply line and load. Conventional forms of power supplies provided for performing these desired functions are relatively large, principally due to the size and weight of power transformers, filter chokes and capacitors.

In such a power supply it is desirable to have a sufficient amount of energy stored to allow the operation of the computer for a period of time after the loss of AC power so as to allow the computer to execute its shut down routine thus preserving its program.

Since energy is more easily stored in a capacitor at high voltage than at low voltage ($E=½\ CV^2$) and since the efficiency of subsequent conversion to AC is greater when carried out at a DC voltage level, it is desireable to use a line commutated preregulator circuit that produces a high DC output voltage.

Line commutated preregulators are not easily adapted to operation on both 115 and 230 volt AC lines without compromise in performance or substantial increase in size. For example, operating from one input voltage will produce significant variations in output DC voltage, impedance, and ripple voltage compared to operation from the other input voltage. A capacitor input, voltage doubling bridge can be used to substantially eliminate such problems; however, the high capacitor charging currents involved prevent the use of semiconductor devices such as SCRs for the purpose of regulating the output voltage except for very low power applications. The use of chokes to limit such current results in the return to the above noted compromises in performance.

SUMMARY OF THE INVENTION

The present invention provides an AC to DC power supply system suitable for converting standard AC supply line voltages such as 60 cycle 115 or 230 volt AC power to low voltage, high current DC output levels in a highly efficient manner. The system has a very high conversion efficiency, regardless of line and/or variations, greatly reducing the amount of power dissipated and thus the volume necessary for adequate cooling.

In this system, rectification of the main voltage from the supply line is accomplished in the preregulator without transformer isolation by utilizing a four-diode bridge circuit wherein two of the diodes are SCRs, the bridge having a choke in the output loop thereof for holding current levels at safe values for the proper SCR operation. The SCRs are controlled such that a regulated DC output voltage is maintained with good independence from line and/or load variations.

The output of the rectifier bridge circuit is converted to square wave AC at a frequency substantially higher than the frequency of the supply line voltage by a pair of inverter circuits, these inverter circuits being operated so as to be 90° out of phase with each other. Isolation from the input power line is obtained by the inverter transformers which also step the voltage down to an appropriate level for the following rectifier circuits. The high frequency square wave output from the inverters is converted to the desired Dc output voltage levels by an output rectifier circuit, the interval between half-cycles of the square wave output of one inverter being overlapped by half cycles of the square wave output of the other inverter circuit. In this manner the commutation interval of the square wave output of one inverter is filled in by the square wave output of the other inverter and vice versa. Thus, the use of large filter circuits is avoided.

A control circuit is provided for controlling the "turn on" of the SCRs to thereby regulate the voltage output level of the SCR rectifier bridge and thus regulate the final output voltage levels of the power supply.

The preregulator of this system may be operated from either of two input voltage levels, e.g. 115 or 230 volts, to deliver a DC output voltage in one mode substantially indistinguishable from the DC output voltage in the other mode. This is accomplished in a bridge rectifier by the use of a pair of inductors and a pair of capacitors connected in a series loop between the two output terminals of the bridge with the two inductors connected to the two output terminals, respectively, the inductors being mutually coupled and being interconnected so as to be aiding around the loop, and a circuit for connecting the junction of the two capacitors to an input terminal of the bridge for operation in the lower input voltage mode and for disconnecting circuit connection for operation in the higher input voltage mode. Because of the mutual inductive coupling in the pair of inductors, a voltage doubling action is obtained when this circuit connection is established. The circuit thus operates as a voltage doubler in the low input voltage mode and as a conventional bridge rectifier in the high input voltage mode.

In order to reduce the size and weight of the inductors used in the rectifier bridge, it is desirable in many instances to use a value of inductance substantially under the value of L critical, resulting in a higher amplitude of ripple. In order to minimize the ripple amplitude, a novel circuit is provided to double this ripple voltage frequency, without increasing the peak to peak amplitude, so that a filter of decreased size may be subsequently employed to reduce substantially the amplitude of the output ripple.

In addition, a novel timing generator for a controlled switch, such as the SCRs, is provided, this generator including means for generating a control signal for the SCRs in the preregulator bridge such that the average value of the SCR bridge output remains constant independent of the amplitude variations of the input line voltage.

For the purpose of power conservation, a novel modified darlington configuration is employed in the switching regulator utilized on one output of this power supply wherein the power transistor is operated in saturation, and the driving transistor for the power transistor remains out of saturation, rather than vice versa as in the conventional darlington circuit.

BRIEF DESCRIPTION OF THE DRAWINGS

FIG. 3 is a block diagram of the inverter circuit stage of the power supply of FIG. 1.

FIG. 4 is a schematic diagram of one of the inverter circuits of FIG. 3.

FIG. 5 is a schematic diagram of one of the inverter driver circuits of FIG. 3.

FIG. 7 is a schematic diagram of the switching mode regulator circuit of the power supply of FIG. 1.

FIG. 9 shows traces illustrating the relationship between the firing angle of the SCR's D1 and D2 in the preregulator circuit of FIG. 2 and the voltage level of the input waveform.

FIG. 10 shows traces illustrating the charge time of the capacitor C7 in the integrator circuit of the preregulator control circuit of FIG. 8.

FIG. 11 illustrates the timing pulses in the preregulator control circuit of FIG. 8.

DESCRIPTION OF THE PREFERRED EMBODIMENT

Figure 1:
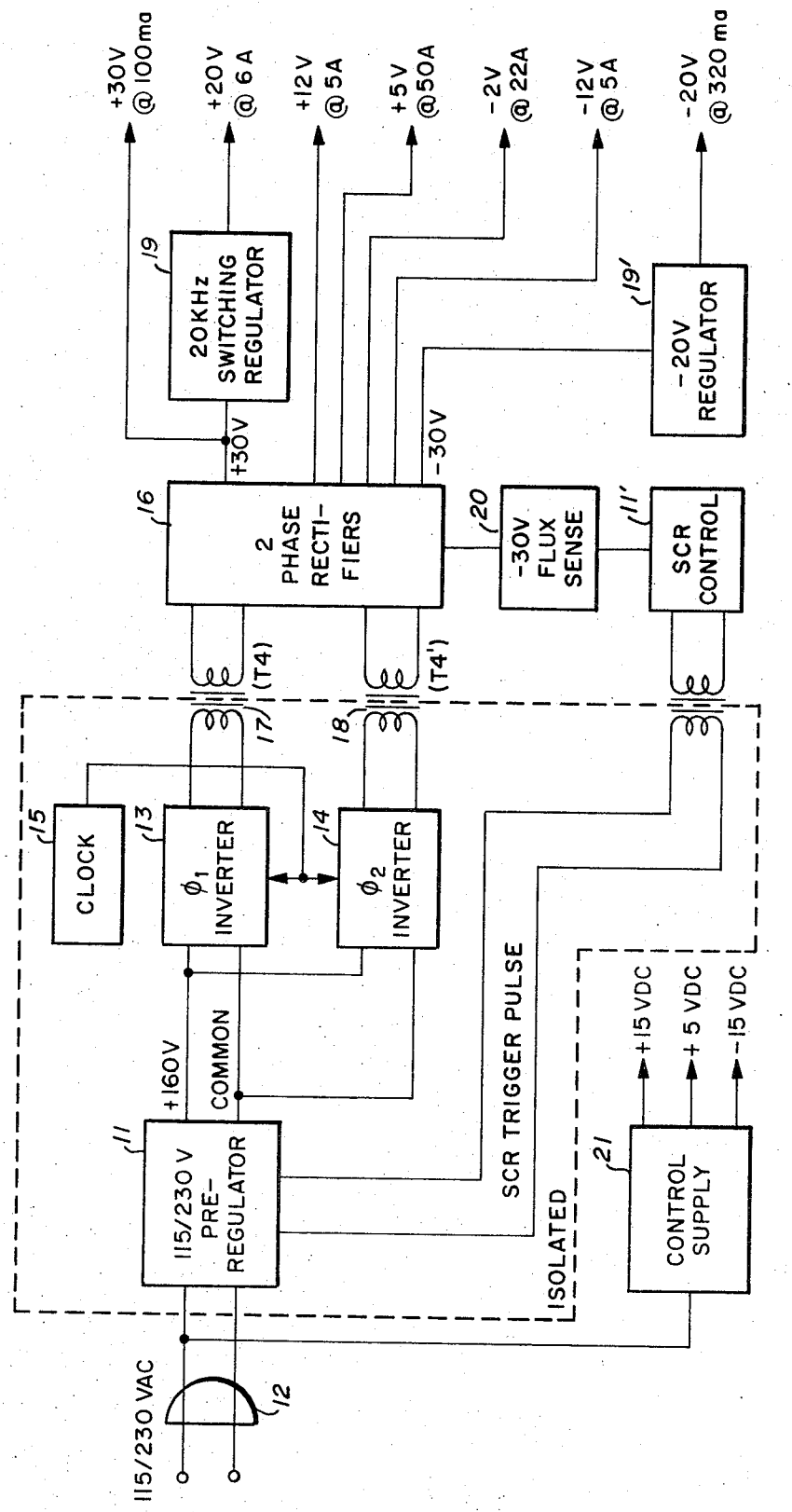
FIG. 1 is a block diagram of the power supply of the present invention.

Referring to FIG. 1, this power supply comprises a preregulator circuit 11 including a rectifier bridge connected across the 60 Hz 115 or 230 volt supply line 12 and producing a DC voltage output at, for example, 160 volts. The bridge includes two SCRs and two diodes, and a choke and capacitor in the output loop. A control circuit 11' for controlling the turnon time of the SCRs dependent on the level of the supply output voltage, and thus regulating the DC output level, is included in the preregulator circuit. In addition, two other control functions are provided in SCR control circuit 11'; one compensates for variations in input line voltage by changing the SCR trigger time in accordance with the line voltage, and the other compensates for variations in the gain of the feedback loop including control circuit 11' in accordance with load current changes.

The output of the preregulator 11 is transmitted to a pair of inverter circuits 13 and 14 each converting the DC input voltage to a square wave AC output at a frequency substantially higher than the 60 Hz line frequency, for example 800 Hz, as determined by clock 15. The square wave outputs of the two inverters 13 and 14 are out-of-phase by 90°, so that the half-wave of one overlaps the commutation interval of the other and vice versa.

These two inverter outputs are then converted to the desired output DC voltage levels by a rectifier circuit 16 including a pair of transformers 17 and 18. One of these output voltage levels is converted to a different output voltage level by a 20 KHz switching regulator circuit 19, and another is converted to a different output voltage level by means of a series-shunt regulator 19'.

A flux sensing circuit 20 associated with the transformers 17 and 18 transmits a signal related to flux change to the preregulator circuit to control the SCR turn on and thus regulate the flux in transformers 17 and 18. A separate power supply 21 provides the voltages necessary for this system.

Figure 2:
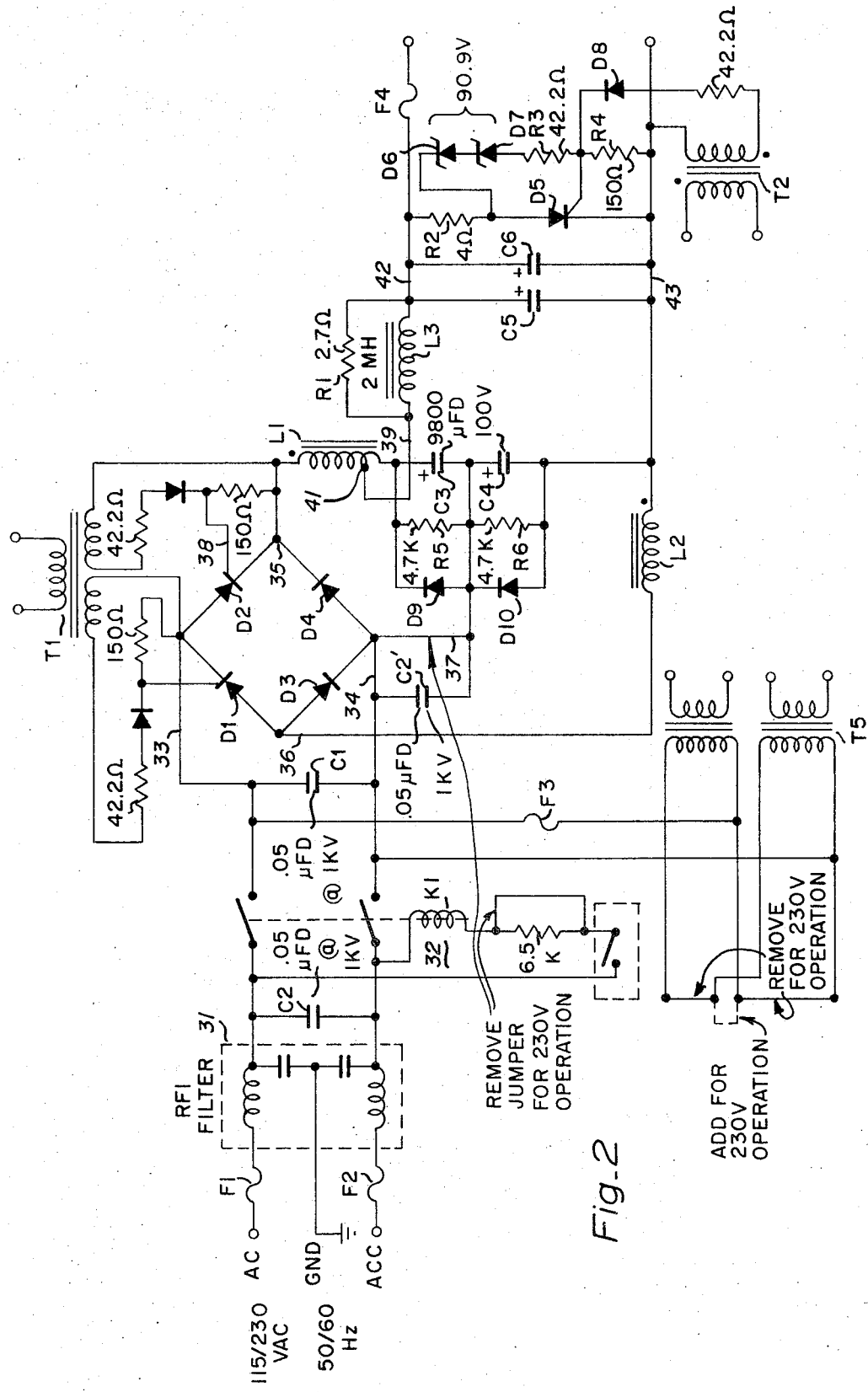
FIG. 2 is a schematic diagram of the preregulator circuit stage of the power supply of FIG. 1.

Referring to FIG. 2, the preregulator circuit comprises an SCR bridge connected across the supply line, which may be 115 or 230 volts AC, double fused at F1 and F2 because of the high current drain. An RFI filter 31 is provided in the line to guard against RF transients feeding back into the line from the SCR switching bridge and to keep line transients from disrupting the supply. Because of the high current values, a relay switch 32 is utilized to establish the energized condition for the system. Capacitors C1, C2 and C2' are included for the purpose of containing any current surges in the bridge loop due to the switching SCRs.

The bridge circuit comprises two SCRs D1 and D2 in the two arms thereof connected to one side 33 of the incoming line and two diodes D3 and D4 in the other two arms connected to the other side 34 of the incoming line. The output terminals 35 and 36 of the bridge are coupled via a first inductor winding L1, two series connected capacitors C3 and C4, and a second inductor winding L2, the two inductor windings L1 and L2 being wound on the same core so as to be mutually coupled and being interconnected so as to be aiding around the loop 35, L1, C3, C4, L2 and 36. A switch or strapping arrangement 37 is provided so that the lower input bridge terminal 34 may be connected to the midpoint of the two capacitors C3 and C4 for operation from a 115 volt input line. For 230 volt input line operation, the strapping 37 is removed.

The operation of this bridge circuit is as follows for 230 volt operation with the strap 37 removed. During the positive half cycle, SCR diode D2 is turned on by a pulse at gate 38 via the gate control circuit including transformer T1, and current flows through diode D2, inductor L1, capacitors C3 and C4, inductor L2, and diode D3 to the other side of the line. During the negative half cycle, SCR diode D1 is turned on and current flows through the loop including diode D4. Because of the mutual inductive coupling, and aiding interconnection, the inductance around the loop is approximately four times the inductance of the individual coils. By straight forward bridge rectifier action, a full wave rectified voltage appears at line 39 with a DC value of 0.636 times the voltage peak of the incoming wave, i.e. about 206 volts for the 230 volt AC input when the SCRs are turned on at the beginning of each half-cycle. The firing angle is adjusted by the feedback control loop including SCR control 11' (see FIG. 1) in such a manner as to hold the output to 160 volts DC.

For the 115 volt input line operation, a voltage doubling is provided by this bridge circuit. The strap 37 is established and, during the positive half-cycle of the incoming signal, the current loop is traced through SCR diode D2, inductor L1, capacitor C3 to the low line terminal 34 of the bridge via strap 37. For the negative half-cycle, the circuit is traced from the lower line 34 through the capacitor C4, inductor L2 and diode D1 to the upper side of the line. During the time that current is flowing through C3, the voltage drop across L1 also appears across L2 due to the mutual inductive coupling, and this voltage back biases diodes D1 and D3 so that no current can flow in L2 during the positive half-cycle. During the negative half-cycle D1 conducts current through L2 charging C4 and the voltage drop across L2 appears across L1 and back biases diodes D2 and D4.

The energy stored in one inductor during one half-cycle is transferred to the other inductor due to the mutual inductive coupling during the next half-cycle to thereby cause the current in the other inductor to rise to a value twice as great as in the bridge operation on the 230 volt input line. Thus, a forced voltage doubling action takes place in the 115 volt input line case, and the output line 39 is maintained at the controlled level of 160 volts.

So that the current in the output loop of the bridge will never drop to zero during the commutation intervals when the input wave form is going from positive to negative or vice versa, the inductors L1 and L2 must be of such a size that the energy stored in each is sufficient to maintain current flow during the half-cycle when no current is supplied to the respective capacitor from the supply line.

For any given value of load resistance, a value of critical inductance can be specified for maintaining this continuous current flow. However, with the high voltage and current requirements for this circuit, maintaining critical inductance values for L1 and L2 requires an inductive structure L1 and L2 of large size and weight. When employing an inductive structure of a smaller size and weight, the inductance values of L1 and L2 fall below the critical value and the end result is that, during the commutation periods, the current in the inductors is depleted and the load current is maintained by a discharge from the capacitors C3 and C4, thus producing a larger ripple voltage on the output line 39.

A ripple reduction circuit is provided which operates to both double the frequency of the ripple voltage and, at the same time, significantly reduce the peak-to-peak voltage of the ripple, thus providing substantially improved regulation and reduced ripple while still permitting the use of inductors L1 and L2 of substantially reduced size and weight. This ripple reduction circuit comprises a tap 41 in the inductor L1, the inductor L3 and the capacitors C5 and C6 across the output line. Two capacitors are used in lieu of one solely for the purpose of obtaining a higher capacitance value with two components more easily fitted within the power supply package.

With the tap in inductor L1, a small voltage signal is obtained which resembles the wave form at terminal 35, and this voltage is added in series with the ripple at the junction of inductor L1 and capacitor C3. The phase of this small voltage is such that it sums with the line ripple to, in effect, fill in the valley portions of the 120 cycle ripple. This produces a wave form on the output line 39 at a frequency of 240 Hz with a peak-to-peak amplitude about one half the value of the ripple voltage at the junction of inductor L1 and capacitor C3. This higher frequency ripple is more easily filtered by the inductor L3, which is substantially smaller than the inductor that would be needed with a ripple frequency of 120 Hz. A resistor R1 connected across the inductor L3 serves to lower the Q to avoid any resonances therein. Thus the effect of undesired ripples generated on the 160 volt line by the use of a significantly smaller inductive structure L1 and L2 is compensated by doubling the ripple frequency and cutting the peak-to-peak amplitude by a significant factor, for example one fourth, at the output line 42. By this technique it has been possible to reduce the value of inductors L1 and L2 from about 50 millihenrys to about 7 to 8 millihenrys while maintaining the same size capacitors C3 and C4. Inductors L1 and L2 are chosen to limit the value of peak current flowing in the primary circuit.

A crowbar circuit comprising the SCR diode D5, a resistor R2, diodes D6 and D7, and resistors R3 and R4 is included for the purpose of power supply and load protection. The two diodes D6 and D7 have values such that the voltage threshold is set at about 180 volts as an upper trip limit. Should the 160 volt line 42 attempt to exceed the 180 volt drop of D6 and D7, the gate of the SCR D5 is turned on. SCR D5 acts to pull the 160 volt line 42 down rapidly. Resistor R2 serves to limit the peak current in diode D5. In addition, the gate SCR D5 can be controlled via diode D8 and transformer T2 from a voltage or current sensing circuit in the load circuit of the system. In addition to the crowbar circuit, the bridge may also be turned off by interrupting the flow of gate pulses to the gates of the SCRs D1 and D2 via the transformer T1 from the preregulator control circuit described more fully below.

The resistors R5 and R6 are provided across the capacitors C3 and C4 for the purpose of discharging the capacitors within a reasonable period of time, for example one minute, so that the circuit may be safely worked on after it is turned off.

Diodes D9 and D10 are provided across the capacitors C3 and C4 to protect these capacitors during the crowbarring of the 160 volt output line 42 by D5. Because of tolerances in the values of C3 and C4, one of these capacitors may be larger than the other by a significant amount. Therefore, during pulldown of the output line 42, the smaller capacitor depletes much faster than the larger capacitor, and the net result, when a zero voltage is reached between the high line 42 and the common line 43, would be a voltage at the junction of the capacitors C3 and C4 proportional to the capacity imbalance. This voltage would be in an inverse direction across the smallest capacitor and thus the diodes D9 and D10 are included to prevent problems due to reverse voltage across the capacitors.

The 160 volt DC output of the preregulator circuit is coupled to two inverter circuits (see FIGS. 1 and 3), one of which is shown in detail in FIG. 4. These inverter circuits generate square wave voltages that are displaced by 90° with respect to each other. The 160 volt line 42 is connected to terminal 44, and the common line 43 is connected to terminal 45 of the inverter circuit. This bridge type circuit comprises four switches Q1, Q2, Q3, and Q4 with their bases connected to the secondary windings 46, 47, 48, and 49, respectively, associated with the primary winding 51 of transformer T3 in the inverter driver (see FIG. 5). The inverter driver circuit of FIG. 5 comprises a pair of "totem pole" driver circuits with the primary of transformer T3 connected across their outputs. The base drive for transistors Q5 and Q6 in the "totem pole" drivers is obtained from a clock source, e.g., 800 Hz. When Q5 is on, Q7 is off and current flows through diode D11 and the collector of Q5 to ground. Q7 is held off by the diode drop. when Q5 is turned off, the voltage at the collector goes high, taking the base of Q7 up, and Q7 performs like an emitter follower bringing the left hand side of the transformer winding 51 high. The two totem pole driver circuits operate alternately to reverse the polarity across the primary transformer winding 51 at the 800 cycle rate thereby energizing the four secondary windings 46-49 at the same frequency rate.

The switches Q1 and Q4 of the inverter circuit of FIG. 4 conduct during one time interval of the cycle and the other two switches Q2 and Q3 conduct during the other time interval. Thus, a substantially square wave output at 800 Hz appears on the two secondary windings 52 and 53 of the transformer T4. Actually, the wave form is not a true alternating square wave but is provided with a very slight idle or dead time interval during the commutation so that transistor pairs Q1, Q2 and Q3, Q4 will not be turned on at the same time, which would result in a current path across the line directly through two series-connected transistors, resulting in serious damage. The slight delay time is provided by the clock pulses to the base drive of Q5 and Q6 in the inverter driver circuits.

There are two inverter circuits in this system and they are operated 90° out-of-phase so that the full wave output of one inverter circuit overlaps the idle or dead interval between the two half-cycles of the other inverter output wave form. This insures that the combined full wave rectified output will not have depressed or valley portions between each half-cycle. If one were to operate single phase and provide a filter circuit to remove the depression between the half-cycle, it would take a very large inductor capacitor circuit because of the very high currents provided with this power supply. By overlapping the two phase outputs, it is not necessary to provide large capacitors and practically pure DC level is obtained without or with very little filtering. There is a very small step-down in the output voltage level where each idle period appears in the output wave form of the two inverters, but this is of minor consequence. By going to this two phase system in lieu of a large amount of capacitor filtering, the amount of filter capacitance needed on all of the power outputs has been reduced and the size and the weight of the power supply substantially reduced. Although the circuitry for an added inverter and inverter driver, including its transformer, has been added, the overall savings in size is very significant.

Figure 6:
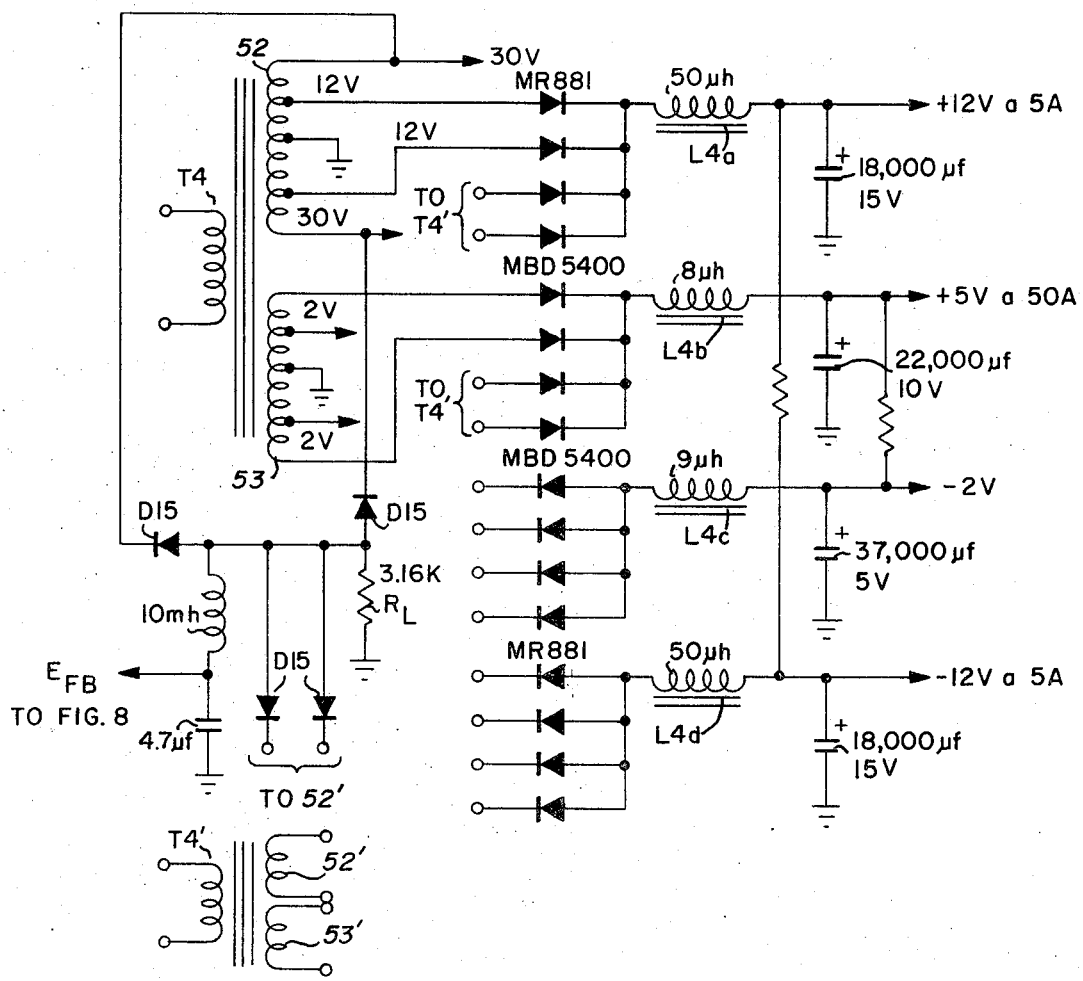
FIG. 6 is a schematic diagram of one of the rectifier circuits of the power supply of FIG. 1.

Referring to FIG. 6, the primary winding of each inverter circuit transformer T4 and T4' is coupled to a pair of secondary windings 52, 53 and 52', 53', respectively, each being center tapped and also having a plurality of taps to provide the desired voltage output levels. This two phase, full wave rectification provides a plurality of separate DC voltage level outputs, for example 30 volts, 12.0 volts, 5.0 volts and 2.0 volts. As noted above, because the two phase operation provides fill in between the individual half wave segments, relatively small inductors L4 a-d may be used in the output filter circuits.

One of the 30 volt DC outputs is coupled to the input of a switching mode regulator circuit shown in FIG. 7 to obtain a regulated voltage output adjustable between, for example, 18.5 volts and 24.5 volts. This switching regulator comprises a switching transistor Q8 coupled to the input by way of a RFI filter circuit L5 and C7, which isolates the 30 volt input from the switching excursions of the switching transistor Q8.

As is well known in switching regulators, the level of the output voltage at output terminal 54 is regulated by the duty cycle, i.e. on-off time, of the switching transistor Q8. This duty cycle is controlled by a feedback signal derived from the output voltage. The output voltage at terminal 54 is fed back through a resistor divider network 55 to one input 56 of a differential amplifier circuit 57; the reference voltage is coupled to the other input 58. An error signal output is generated proportional to the difference between these two inputs.

The output of amplifier 57 is fed to one input 59 of a comparator circuit 61, the other input 62 of the comparator circuit being provided with a triangular wave form input from a triangular wave form generator circuit 63. The output of the comparator circuit is a series of rectangular-shaped pulses, the width of these pulses being determined by the amplitude of the error signal from amplifier 57. These rectangular-shaped signals are utilized via Q10 as the base drive for transistor Q9 coupled to the base of Q8 in a configuration wherein the on time of transistor Q9 controls the duty cycle of the switching transistor Q8.

Typically, in such a switching circuit Q9 is operated in saturation and Q8 out of saturation. When Q9 is saturated, the voltage drop across Q8 is the $V_{BE}$ of Q8 plus $V_{CE\ SAT}$ of Q9. If we assume that the $V_{BE}$ is 1.5 volts and the $V_{CE\ SAT}$ of Q9 is 1 volt, there is a 2.5 volt drop and, at 6 amps, a power loss of about 15 watts. In this modified circuit, however, a tap is provided in L6, which provides a small voltage output, for example 2 volts, to drive the collector of Q9 so that Q9 remains out of saturation; the switching transistor Q8 can then operate in saturation. Assuming Q8 has a $\beta$ of 10 and is operating with 6 amps in the collector, there is .6 amps in the base and, with a base-emitter drop of 1.5 volts and a $V_{CE}$ for Q9 of 0.5 volts, there is a 1.2 watt base drive loss and a 6 watt loss in the collector-emitter region of Q8, if we assume $V_{CE\ SAT}$ of Q8 to be 1 volt for a total power loss of 7.2 watts or half of the loss when operating with Q9 in saturation. In addition, the current for the base drive of Q8 is returned to the load via the collector of Q9. Although this illustration indicates a power reduction factor of two, actually in use the power reduction factor is considerably greater in many cases. Furthermore, operating Q9 out of saturation reduces its switching time.

With this arrangement where Q8 is in saturation, if a significant amount of current flows in the base of Q9, Q9 will tend to go into saturation and reduce the $V_{CE}$ as low as possible, drawing significant amounts of current through the base-to-emitter junction of Q8, resulting in excess power dissipation. It is therefore desirable to limit the current through the base of Q8, and this is accomplished by transistor Q11 and resistor R7. As current is drawn through R8, the emitter conduction of Q9 increases, and the current flow through R7 increases. When the voltage drop across R7 rises to a selected value, it turns on transistor Q11, which operates to divert current from R8 around the base-emitter circuit of Q9. This diverted current avoids the $\beta$ multiplication of Q9 and thus limits the current to the base of Q8, resulting in a substantial power saving.

Another substantial power saving circuit comprises the capacitor and resistor circuit C8 and R9 coupled to the base of Q12 and connected across the base-emitter region of Q8. When Q8 is in saturation and preparing to turn off, it operates in the stored charge mode. As Q8 begins to come out of saturation, there is a change in the voltage across Q8. When the voltage across Q8 changes, the capacitor-resistor network differentiates that change and feeds a current into the base of Q12. Q12 then turns on, sweeping the charge out of the base region of Q8. This decreases the fall time of Q8, and thus result in a reduction in the power loss during Q8 turn off.

Figure 8:
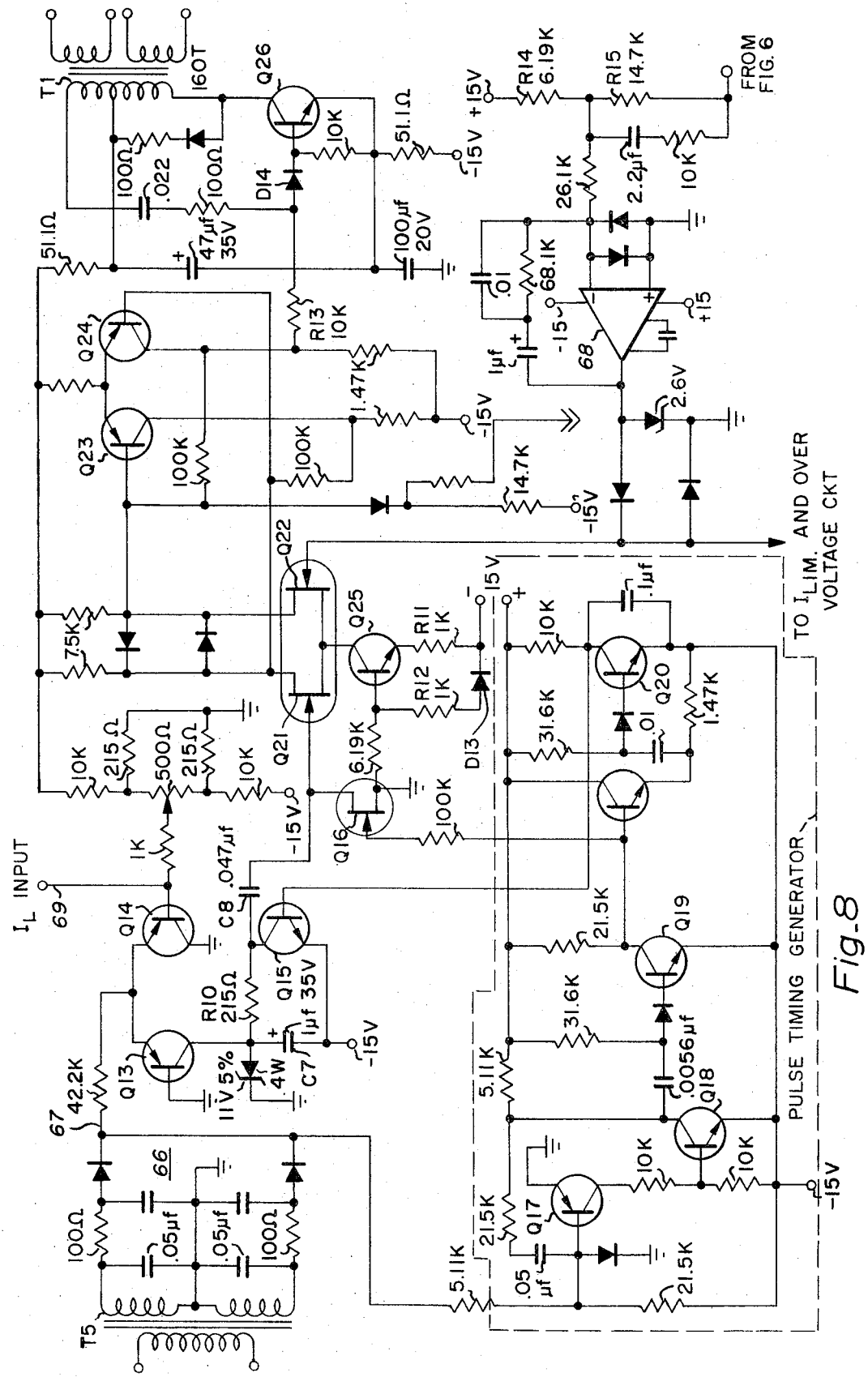
FIG. 8 is a schematic diagram of the preregulator control circuit of the power supply of FIG. 1.

A preregulator control circuit shown in FIG. 8 is provided to generate an output function such that, should the supply line voltage change, the firing angles of the two SCRs D1 and D2 in the input bridge circuit change by a time increment just sufficient to hold the DC level output of the bridge constant. This provides a first regulation of the output line. Precise control of the output voltage is provided by a flux sensing technique described below.

The traces in FIG. 9 illustrate the relationship between the firing angle of the SCRs D1 and D2 and the voltage level of the input wave form needed to maintain a constant voltage level output from the bridge circuit of, for example, 160 volts. It is seen that, for a low level input line voltage represented by curve A, a firing angle represented by point A' is required whereas with a high level of input voltage represented by line B a different firing angle B' is dictated. A means of developing the proper triggering time in response to line voltage is given below.

The input voltage is supplied through transformer T5 to a full wave rectifier circuit 66 which produces a rectified wave form output at 67 (see FIG. 11a). A similar current wave form passes into the emitter of Q13 of an integrator circuit including the capacitor C7. The amount of current passing to C7 may be controlled by means of Q14. The charge on capacitor C7 rises as shown in FIG. 10 during the half-cycle period. A reset pulse on the base of Q15 from the pulse timing generator at about the zero point in the full wave rectified wave form resets the integrating circuit, and the voltage at the collector of Q15 drops to a low value. Resistor R10 limits the capacitor discharge current. The collector voltage of Q15 drops to the point where Q15 is saturated, and it remains saturated for a short period until the base of Q15 is turned off and the voltage at the collector rises and the integration cycle begins again.

It is desired that the base level of this wave form be established at the peak point of the integration curve and that the lower level of this voltage wave form be allowed to vary in accordance with the line voltage variance. In this manner, the lower level will vary in direct relationship to the voltage level of the input line, a high input voltage giving a greater voltage excursion for the integrated wave form than a lower input voltage. Establishment of the base level at the top of the integrated wave form is provided by the DC restorer circuit comprising the FET switch Q16 which operates on each half-cycle to establish the right-hand side of capacitor C8 at ground level just prior to reset of the integrator. The FET switch Q16 is turned on and off by a pulse from the pulse timing generator just prior to delivery of the reset trigger pulse to Q15.

The pulse timing generator comprises the circuit shown in the dotted line enclosure. This circuit operates from the input wave form (see FIG. 11a) at the base of Q17 to produce a rectangular wave form (see FIG. 11b) at the base of Q18, a reset pulse at the collector of Q19, is which is used to operate the FET switch Q16, and a reset signal (see FIG. 11d) at the collector of Q20, which has an initial ramp portion building up to the turn-on voltage level required by reset transistor Q15. The ramp portion of the waveform shown in FIG. 11d is to allow sufficient time delay for the FET switch Q16 to perform the DC restoration before the integrator circuit is reset.

A comparator circuit is formed by a differential amplifier stage including FET Q21 and FET Q22 and a flip-flop or DC coupled multivibrator stage including transistors Q23 and Q24. Transistor Q25, resistors R11 and R12, and diode D13 comprise a constant current source for the differential amplifier stage. The voltage on the input of the input FET Q21 of the differential amplifier is compared with the amplified feedback voltage applied to FET Q22 from a differential amplifier 68. When the input level to the FET Q21 reaches the voltage established at the gate FET Q22, the flip-flop circuit including transistor Q23 and Q24 is operated to produce a square pulse output. The width of the output pulse is dependent on the time interval between the comparator level cross-over and the integrator reset, which time interval is in turn dependent on the voltage level of the input line to the gate of FET Q22.

The output of the flip-flop is coupled to a blocking oscillator circuit which includes the transistor Q26, the output of the flip-flop being coupled to the oscillator via resistor R13 and diode D14. When the left-hand side of R13 is elevated above −15 volts by about 3 volts, current flows through diode D14, developing a voltage drop across resistor R13. A portion of the current flow through the base-emitter junction of Q26, causing it to conduct and pass current through the primary winding of transformer T1. This initiates a series of pulses from the blocking oscillator Q26. The secondary windings of the transformer T1 are the SCR gate control windings shown in FIG. 2.

This blocking oscillator works in a regenerative fashion to produce a series of output pulses for the interval that the flip-flop is on, i.e. as long as a high input appears at the base of Q26. The time of initiation of this series of pulses is dependent on the width of the pulse generated by the flip-flop and is thus dependent on the amplitude of the input voltage applied to the gate of Q22. A series of trigger pulses is provided rather than a single SCR gating pulse to insure that, should the SCR not be in condition to be triggered or turned on upon receipt of the first trigger pulse, it will be turned on at the first opportunity by a subsequent pulse in the trigger pulse series. This insures that the bridge circuit will not miss a cycle of operation in the AC rectification.

Provisions are made to enable the turn-off of the SCR trigger pulses so that the regulator operation may be terminated. In one case, either a −15 "off" voltage or +15 "on" voltage may be connected to the input of Q23. In another instance, control may be accomplished by a +15 volt off voltage or a −15 on voltage at the gate of Q22.

The gain of this system may be regulated in response to an input voltage derived from the load current and applied to the base of multiplier Q14, which multiplies the input voltage at 69 by the current derived for the integrator circuit from the input transformer T5. This input voltage serves to direct current flow between the two transistors Q13 and Q14 and thus regulates the current flow into the integrator capacitor C7. The multiplier control voltage is derived from load current sensing circuits comprising current transformer T6 and T6', and the associated rectifiers D16 and amplifier circuit 71 (see FIG. 4). Current transformers T6 and T6' are connected in series with the primaries of inverter transformers T4 and T4', respectively.

The input signal fed back to the preregulator control circuit to control the differential amplifier 68, and thus control the fire time of the SCRs, could be obtained from one of the output load circuits. This would serve to regulate the output voltage relative to that particular output voltage level, but would result in a relatively poor regulation of the other DC output levels. For this reason, a feedback signal is derived which is proportional to the flux density of the transformers T4 and T4' shown in FIGS. 3 and 6. In this embodiment, the flux is sensed with the 30 volt transformer secondary winding by means of the flux sensing diodes D15, a separate pair of such diodes being coupled to each 30 volt secondary of the two inverter transformers T4 and T4'. The feedback signal is $E_{FB} = N\ (d\phi/dt) - E(R$ secondary winding $+ R$ diode$)/R_L - V$ diode.

The −30 volt feedback signal obtained with this circuit is thus dependent on $N\ (d\phi/dt)$ and is compared to the reference voltage +15V by resistor network R14 and R15, thus generating an error signal at the input to amplifier 68. The output of amplifier 68 changes the level of comparison at the input of comparators Q21 and Q22 in such a manner as to adjust the firing angle of the SCRs as described above. Thus the flux in the inverter transformers T4 and T4' is maintained constant, insuring good output line regulation.

Certain novel features of this power supply, including the flux sensing feedback control and the control of the gain crossover of the feedback loop responsive to load current are described and claimed in a copending patent application Ser. No. 253,465 filed on May 15, 1972, by Bernard M. Oliver and entitled "Power Supply Utilizing Improved Voltage Regulation." The novel circuit for decreasing fall time of the switching regulator transistor is described and claimed in a copending patent application Ser. No. 244,370 filed on Apr. 17, 1972, by Richard D. Crawford and entitled "Turn-Off Circuit for Switching Transistor." Both of these patent applications are assigned to the assignee of this subject application.

I claim:

1. A rectifier bridge circuit comprising:
   a bridge having four arms, two input terminals for being coupled to an incoming AC supply line having a line frequency, and two output terminals, each of two of said arms containing a controlled switching element and each of the other two of said arms containing a diode, said bridge being operable for producing across the output terminals a recurring output waveform having a DC component, having fluctuating components, and having a repetition frequency of twice the line frequency;
   circuit means coupled across the output terminals for converting the fluctuating components of the recurring output waveform to an alternating current having a frequency at a harmonic of the repetition frequency of the recurring output waveform and for creating a ripple voltage component at said harmonic;
   a filter; and
   means for inductively coupling said circuit means to said filter to supply said DC component and said ripple voltage component thereto.

2. A rectifier bridge circuit as in claim 1 wherein said harmonic is a second harmonic thereby creating said ripple voltage component at a frequency which is four times the line frequency.

3. A rectifier bridge circuit as in claim 1 wherein said circuit means comprises:
   a circuit loop coupled across said output terminals, said circuit loop comprising an inductor and a capacitor coupled in series, said inductor having a value of inductance below the critical value of inductance necessary to maintain current flow through the inductor during the time intervals when said controlled switching elements are in a nonconducting state, said inductor being coupled to one of said output terminals and said capacitor being coupled to the other of said output terminals whereby a voltage is developed across said inductor and said capacitor; and
   summing means for applying the sum of the voltage across said capacitor and a fractional in-phase portion of the voltage across said inductor and producing as an output said ripple voltage component at said harmonic.

4. A rectifier bridge circuit as in claim 3 wherein said summing means comprises a tap on said inductor, said tap being directly connected to an inductor of said filter.

* * * * *